(12) United States Patent  (10) Patent No.: US 8,717,339 B2
Satake  (45) Date of Patent: May 6, 2014

(54) IMAGE DISPLAY APPARATUS

(75) Inventor: Masaomi Satake, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 254 days.

(21) Appl. No.: 13/121,100

(22) PCT Filed: Sep. 25, 2009

(86) PCT No.: PCT/JP2009/066687
§ 371 (c)(1),
(2), (4) Date: Mar. 25, 2011

(87) PCT Pub. No.: WO2010/035804
PCT Pub. Date: Apr. 1, 2010

(65) Prior Publication Data
US 2011/0175867 A1    Jul. 21, 2011

(30) Foreign Application Priority Data

Sep. 26, 2008  (JP) .................................. 2008-248702

(51) Int. Cl.
*G06F 3/038* (2013.01)
(52) U.S. Cl.
USPC ........... 345/204; 715/810; 715/825; 715/835; 715/838
(58) Field of Classification Search
USPC .................. 345/204; 715/810, 825, 835, 838
See application file for complete search history.

(56) References Cited

U.S. PATENT DOCUMENTS

| 4,984,082 | A | * | 1/1991 | Okamura | 348/565 |
|---|---|---|---|---|---|
| 5,146,335 | A | * | 9/1992 | Kim et al. | 348/564 |
| 5,398,074 | A | * | 3/1995 | Duffield et al. | 348/564 |
| 5,528,304 | A | * | 6/1996 | Cherrick et al. | 725/41 |
| 5,682,207 | A | * | 10/1997 | Takeda et al. | 348/568 |

(Continued)

FOREIGN PATENT DOCUMENTS

| CN | 1735163 A | 2/2006 |
|---|---|---|
| CN | 101026702 A | 8/2007 |

(Continued)

OTHER PUBLICATIONS

Office Action dated Jul. 13, 2012, issued in counterpart Korean Application No. 10-2011-7006949.

(Continued)

*Primary Examiner* — Gregory J Tryder
*Assistant Examiner* — Peter D McLoone
(74) *Attorney, Agent, or Firm* — Procopio, Cory, Hargreaves & Savitch LLP

(57) ABSTRACT

An image display apparatus includes: a display unit having a main display area for displaying an image of a main channel and a sub display area for displaying images of channels which can be interchanged with the image of the main channel in the main display area; a replacement unit for replacing the images of the channels displayed in the sub display area with images of other channels not displayed in the sub display area; and a control unit which, after an operation to interchange images of channels in the main and sub display areas is performed with the image of the channel displayed in the main display area as an interchange source, controls to prevent the image of the interchange source channel previously displayed in the main display area which after the interchange is displayed in the sub display area from being a replacing target of the replacement unit.

4 Claims, 12 Drawing Sheets

(56) References Cited

U.S. PATENT DOCUMENTS

| | | | |
|---|---|---|---|
| 6,091,771 A * | 7/2000 | Seeley et al. | 375/240 |
| 6,331,877 B1 * | 12/2001 | Bennington et al. | 348/731 |
| 6,384,868 B1 * | 5/2002 | Oguma | 348/564 |
| 6,493,038 B1 * | 12/2002 | Singh et al. | 348/565 |
| 7,119,849 B2 * | 10/2006 | Yui et al. | 348/564 |
| 7,154,558 B2 * | 12/2006 | Yui et al. | 348/565 |
| 7,768,576 B2 * | 8/2010 | Yui et al. | 348/564 |
| 7,814,421 B2 * | 10/2010 | Reynolds et al. | 715/716 |
| 7,870,583 B2 * | 1/2011 | Kim et al. | 725/43 |
| 7,990,473 B2 * | 8/2011 | Fujiwara et al. | 348/565 |
| 8,125,573 B2 * | 2/2012 | Ohta | 348/731 |
| 2002/0033899 A1 * | 3/2002 | Oguma | 348/565 |
| 2002/0196367 A1 * | 12/2002 | Yui et al. | 348/565 |
| 2005/0071782 A1 * | 3/2005 | Barrett et al. | 715/838 |
| 2005/0114885 A1 * | 5/2005 | Shikata et al. | 725/38 |
| 2006/0037045 A1 * | 2/2006 | Hsieh | 725/43 |
| 2007/0188655 A1 | 8/2007 | Ohta | |
| 2007/0277214 A1 * | 11/2007 | Kim et al. | 725/131 |
| 2009/0044220 A1 * | 2/2009 | D'hoore et al. | 725/38 |
| 2011/0072468 A1 * | 3/2011 | Kim et al. | 725/56 |

FOREIGN PATENT DOCUMENTS

| | | |
|---|---|---|
| JP | 07-284032 A | 10/1995 |
| JP | 11-261920 A | 9/1999 |
| JP | 11-308551 A | 11/1999 |
| JP | 2007-201759 A | 8/2007 |

OTHER PUBLICATIONS

International Search Report dated Oct. 20, 2009 issued by the Japanese Patent Office for International Application No. PCT/JP2009/066687.

Notification of Reasons for Refusal dated May 15, 2012, issued in counterpart Japanese Application No. 2010-530878.

First Office Action dated Dec. 25, 2012, issued in counterpart Chinese application No. 200980137919.2.

Office Action dated Aug. 28, 2013, issued in counterpart Chinese application No. 200980137919.2.

\* cited by examiner

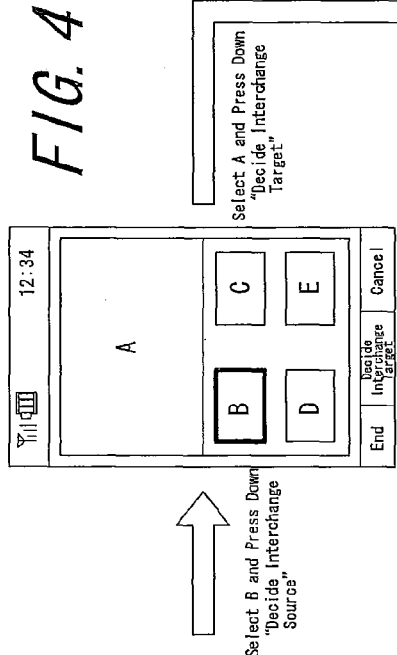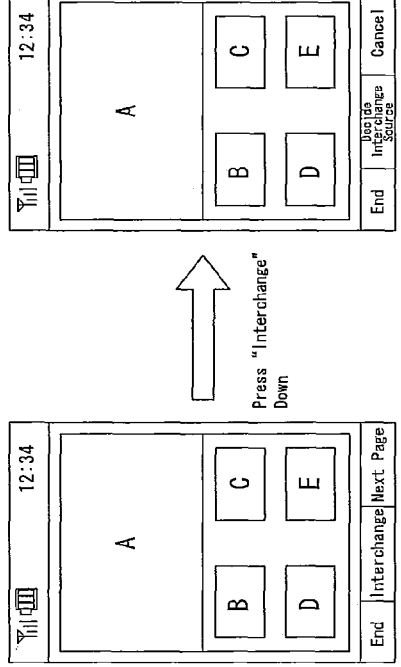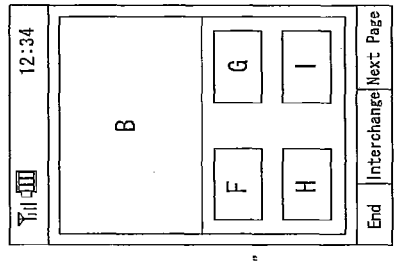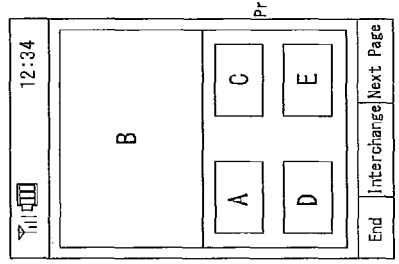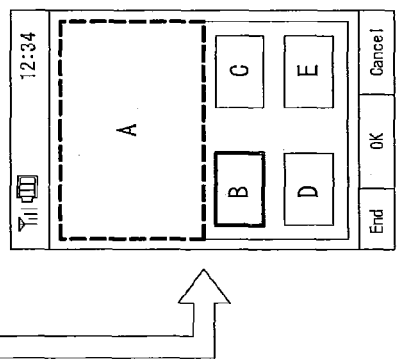
FIG. 4

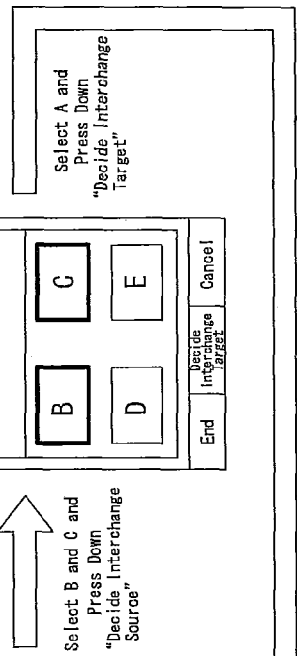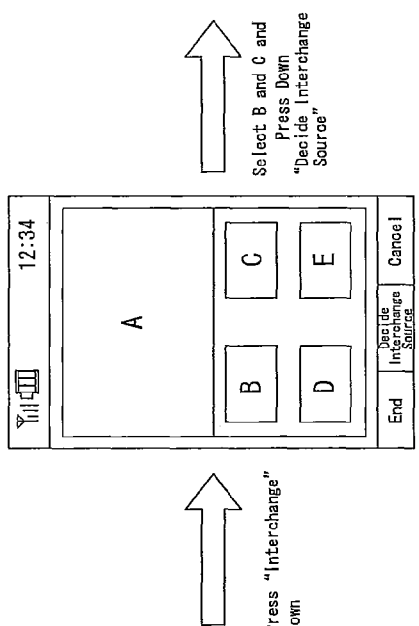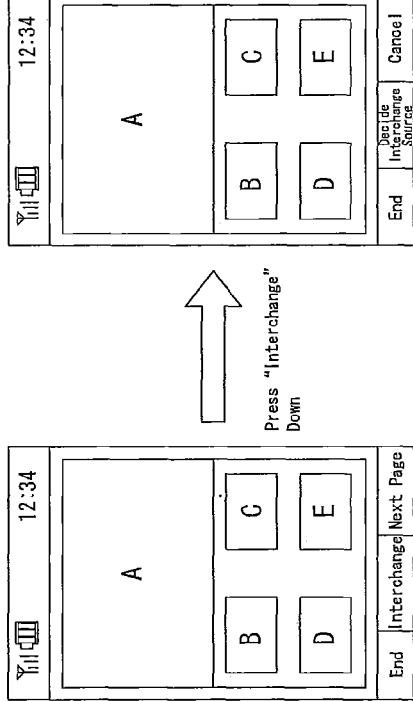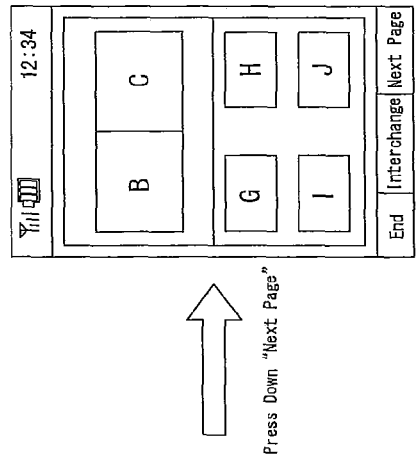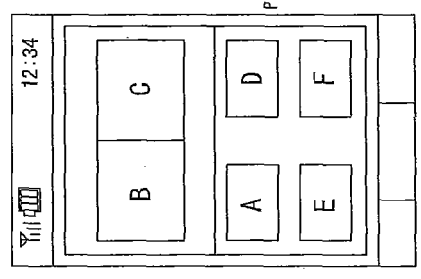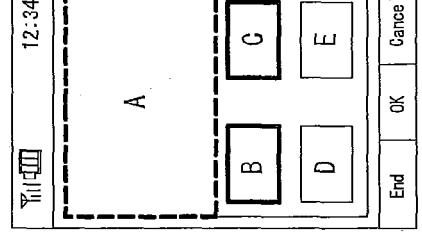
FIG. 6

FIG. 9
(a) 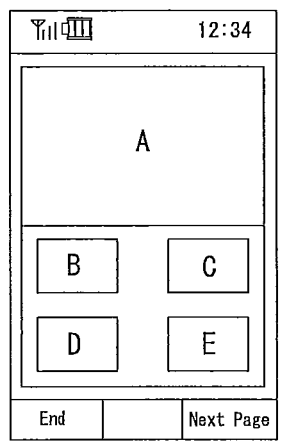
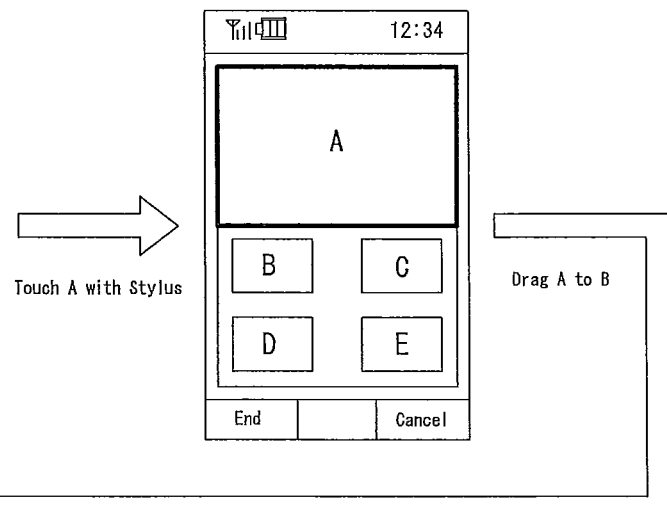
(b)
Touch A with Stylus
Drag A to B
(c) 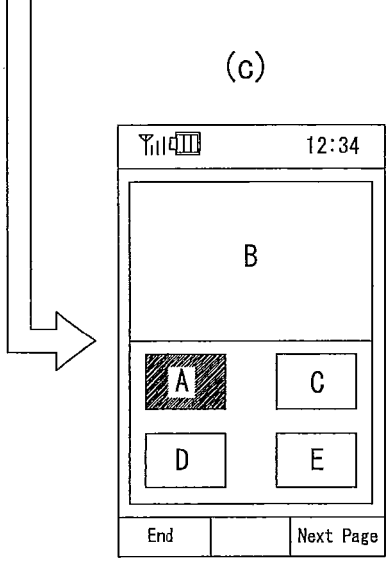
Touch "Next Page"
(d) 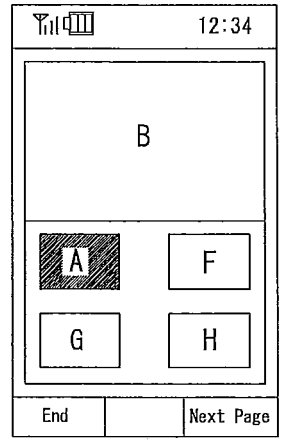

IMAGE DISPLAY APPARATUS

CROSS REFERENCE TO RELATED APPLICATION

This application claims priority to and the benefit of Japanese Patent Application No. 2008-248702 filed on Sep. 26, 2008, the entire contents of which are incorporated herein by reference.

TECHNICAL FIELD

The present invention relates to image display apparatuses which display images of a plurality of channels on a single screen to enable a channel selection.

BACKGROUND ART

In order to select a desired channel of a cable television (CATV) and the like, other than direct selection of a channel number or passing channels in order by using a channel key on a remocon, there is a method to select a channel by moving a pointer on a single screen displaying reduced images of multiple channels (approximately 16 channels) by using the remocon (see Patent Document 1).

DOCUMENTS OF PRIOR ART

Patent Document

Patent Document 1: Japanese Patent Laid-Open No. 7-284032

SUMMARY OF INVENTION

Technical Problem

However, since a display area per channel is reduced when images of the multiple channels are displayed in a single screen as stated above, there is a problem that it is necessary to select a channel to display it full-screen in order to view high definition images thereof, which deteriorates operability.

Therefore, there is concerned an application which divides the single screen into a main display area for displaying a large image of a desired channel and a sub display area for displaying a list of small image(s) of one or more channels. When a user selects a channel to view from the channels in the sub display area, this application displays an enlarged image of this selected channel in the main display area, so that the user can search easily for a desired channel among the channels shown in the list.

In addition, a method to display the list as stated above is suitable for a broadcast scheme such as MediaFLO (registered trademark), for example, which can simultaneously receive multiple channels by using one tuner.

However, since this display method limits the sub display area for displaying the list of the channels in a small area, it is necessary for the user, in order to display all channels, to open following pages of the sub display area. There is a problem that, when the user selects a channel in the main display area and interchanges it with a channel in the sub display area and then opens the following page, the channel previously displayed in the main display area is not displayed in the sub display area anymore and thus the user needs troublesome operations to return to this channel to view it.

In consideration of such a problem, an object of the present invention is to provide an image display apparatus capable of maintaining a good operability even if a user selects a channel displayed in the main display area and interchanges it with a channel in the sub display area and then opens the following pages in the sub display area.

Solution to Problem

An image display apparatus according to the present invention includes: a display unit having a main display area for displaying an image of a main channel and a sub display area for displaying images of channels which can be interchanged with the image of the main channel in the main display area; a replacement unit for replacing the images of the channels displayed in the sub display area with images of other channels not displayed in the sub display area; and a control unit which, after an operation to interchange images of channels in the main display area and the sub display area is performed, with the image of the channel displayed in the main display area is a base point as an interchange source, controls to prevent the image of the interchange source channel previously displayed in the main display area which after the interchange is displayed in the sub display area from being a replacing target of the replacement unit.

In addition, after an operation to interchange images of channels in the sub display area and the main display area is performed with the image of a channel displayed the sub display area is a base point as an interchange source, the control unit controls to permit the image of the channel previously displayed in the main display area which after the interchange is displayed in the sub display area to be a replacing target of the replacement unit.

Effects of the Invention

According to the present invention, when a channel in the main display area is selected and interchanged with a channel in the sub display area, a display position of the channel to be displayed in the sub display area is fixed. Thereby, it enables easy return to the channel previously displayed in the main display area, even when the following page is open in the sub display area.

In addition, according to the present invention, when a channel in the sub display area is selected and interchanged with a channel in the main display area, a display position of the channel to be displayed in the sub display area is not fixed. Accordingly, it is possible to hide an unnecessary channel by opening the following page, which improves operability.

BRIEF DESCRIPTION OF DRAWINGS

FIG. 4 is a diagram illustrating a second example of the channel display by the image display apparatus according to the first embodiment;

FIG. 6 is a diagram illustrating a fourth example of the channel display by the image display apparatus according to the first embodiment;

FIG. 9 is a diagram illustrating a first example of channel display by an image display apparatus according to a second embodiment;

DESCRIPTION OF EMBODIMENTS

Figure 1:
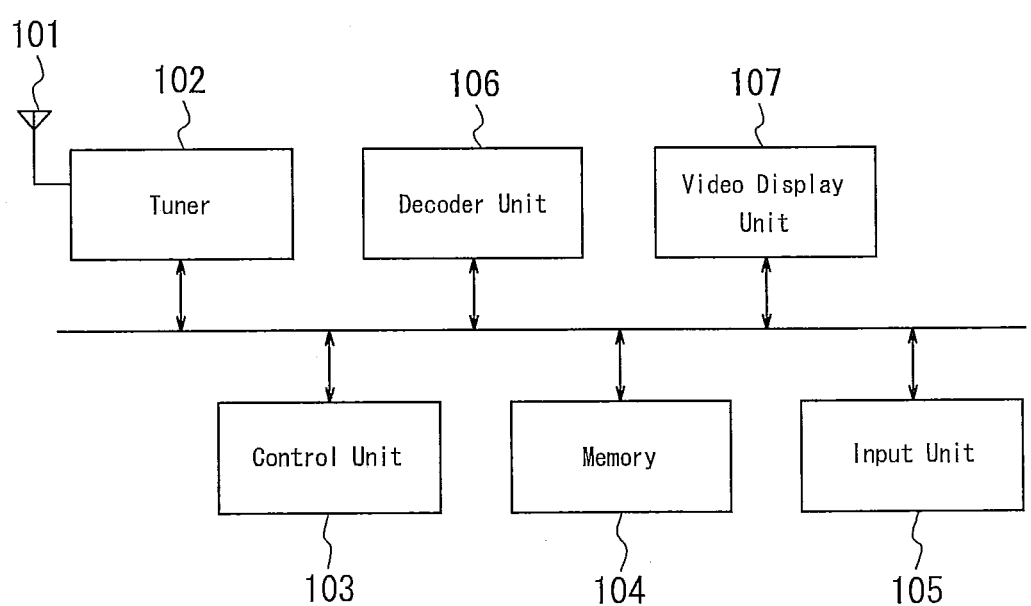
FIG. 1 is a diagram illustrating a schematic configuration of an image display apparatus according to a first embodiment of the present invention.

Embodiments of the present invention will be described with reference to the accompanying drawings. FIG. 1 is a diagram illustrating a schematic configuration of an image display apparatus according to a first embodiment of the present invention. As shown in FIG. 1, the image display apparatus includes an antenna 101, a tuner 102 for receiving broadcast waves, a memory 104 for storing broadcast video data, a decoder unit 106 for decoding the broadcast video data stored in the memory 104, a video display unit (display unit) 107 such as an organic EL and the like for displaying video decoded by the decoder unit 106, an input unit 105 for receiving input from a user and a control unit (replacement unit, control unit) 103 for controlling overall.

Figure 2:
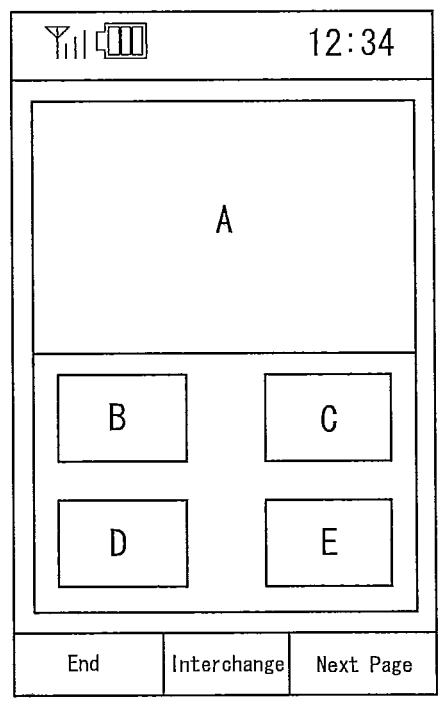
FIG. 2 is a diagram illustrating an exemplary list display screen displayed in a video display unit.

FIG. 2 is a diagram illustrating exemplary list display screen on the video display unit. It is assumed that alphabets A-H in the figure represent images of respective channels A-H. The list display screen has a main display area for displaying an image of a main channel and a sub display area for displaying images of channels which can be interchanged with the image in the main display area. In FIG. 2, an area showing the image of the channel A is the main display area, whereas an area showing the images of the channels B-E is the sub display area.

Under the list display screen, there displayed are soft keys such as an "End" key for closing the list display screen, an "Interchange" key for performing an interchange operation of the image of the channel displayed in the main display area and an image of a channel displayed in the sub display area, and a "Next Page" key for performing a replacing operation of images of the channels in the sub display area with images of other channels not displayed therein.

When the interchange operation is performed on the image of the channel in the main display area as a base point, with an image of a channel in the sub display area, the control unit 103 controls the image of the channel, previously displayed in the main display area and, after such interchange, displayed in the sub display area, not to be a replacing target of the "Next Page" key. Whereas, when the interchange operation is performed on the image of the channel in the sub display area as a base point with the image of the channel in the main display area, the control unit 103 controls the image of the channel, previously displayed in the main display area and, after such interchange, displayed in the sub display area, to be a replacing target of the "Next Page" key.

In addition, when the "Next Page" key is pressed down, the control unit 103 replaces the images of the channels displayed in the sub display area with images of other channels not displayed therein.

Figure 3:
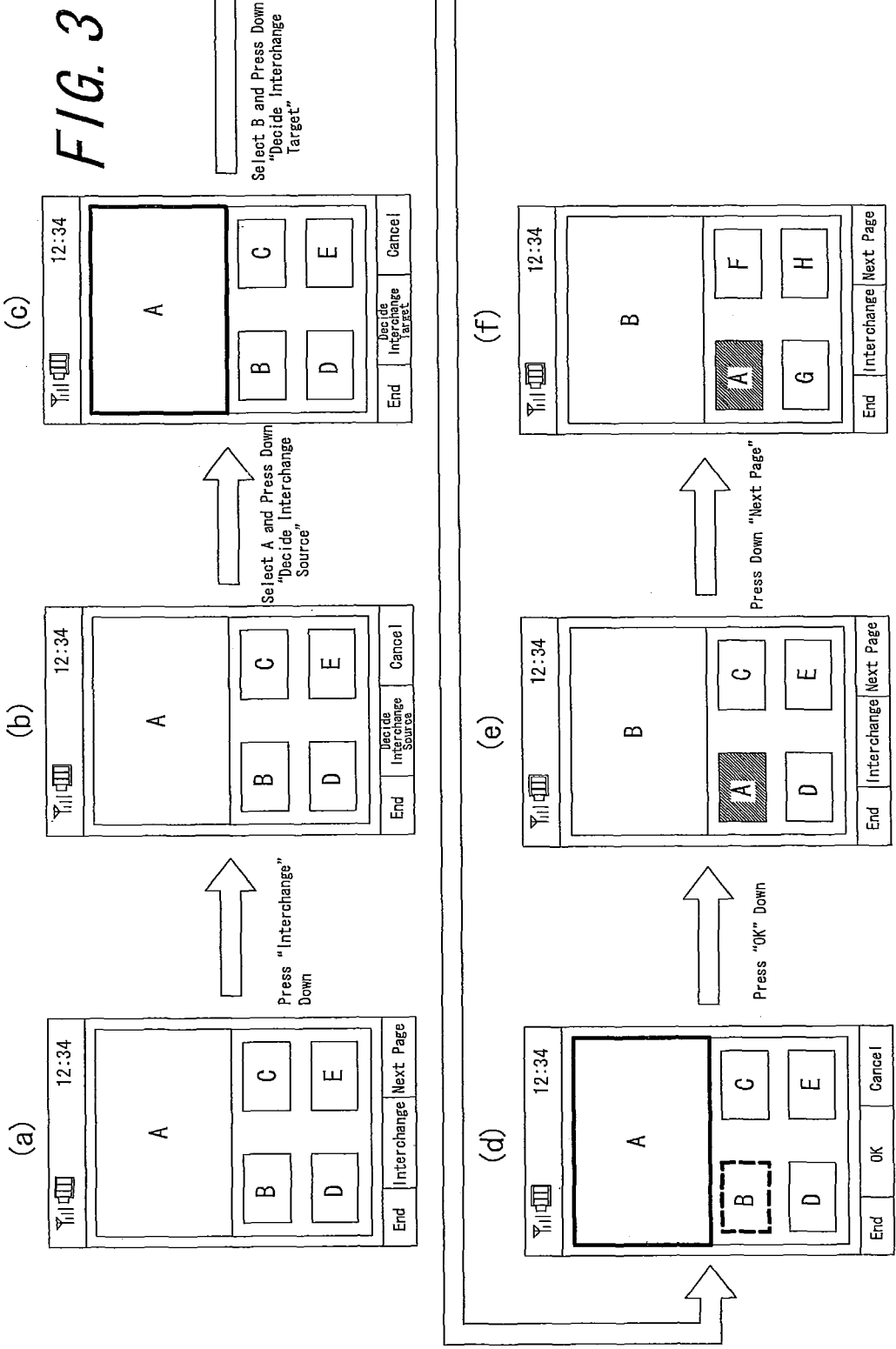
FIG. 3 is a diagram illustrating a first example of channel display by the image display apparatus according to the first embodiment.

FIG. 3 is a diagram illustrating a first example of channel display by the image display apparatus according to the first embodiment. When a user presses the "Interchange" key down on the list display screen shown in FIG. 3(a) in order to select a channel, the image display apparatus displays an interchange source channel selection screen (FIG. 3(b)). When the user selects the image of the channel A in the main display area (as the base point) and presses down a "Decide interchange source" key, the image display apparatus indicates that the interchange source selection is completed with a thick frame and the like, and then displays an interchange target channel selection screen (FIG. 3(c)). Next, when the user selects the image of the channel B in the sub display area and presses down a "Decide interchange target" key, the image display apparatus indicates that the interchange target selection is completed with dotted lines and the like and then displays an interchange decided selection screen (FIG. 3(d)). Then, when the user presses an "OK" key, the image display apparatus displays the image of the channels A and the image of the channel B by interchanging them. Audio of the channel A is also replaced with that of the channel B (FIG. 3(e)). At this time, the image of the channel A is fixedly displayed at a display position. When the user presses the "Next Page" key down in this state, the image of the channel A is remained at the display position while images of other channels (C-E) are replaced (FIG. 3(f)). It is also possible that the image display apparatus displays a mark to indicate that the image of the channel A is fixedly displayed at the display position.

In the first example of the channel display, when the user selects the channel in the main display area (as the base point) and interchanges it with the channel in the sub display area, the channel interchanged and displayed in the sub display area is displayed at the fixed display position. Therefore, it enables the user to easily return to the channel (interchanged channel) which has been displayed in the main display area even when opening the following page in the sub display area.

An operation by the user to select a channel displayed in the main display area and then to execute interchange includes an intention of the user to leave the channel desired to view in the sub display area.

Especially if the image display apparatus according to the present invention is applied to channel display by a broadcasting receiver capable of receiving multiple channels such as MediaFLO, since an original channel remains in the sub display area which is previously viewed, the user can see the image of the original channel while viewing broadcasting of another channel.

FIG. 4 is a diagram illustrating a second example of the channel display by the image display apparatus according to the first embodiment. When the user presses the "Interchange" key down in the list display screen shown in FIG. 4(a) in order to select a channel, the image display apparatus displays the interchange source channel selection screen (FIG. 4(b)). When the user selects the image of the channel B in the sub display area (as the base point) and presses down the "Decide interchange source" key, the image display apparatus indicates that the interchange source selection is completed with the thick frame and the like, and then displays the interchange target channel selection screen (FIG. 4(c)). Next, when the user selects the image of the channel A in the main display area and presses down the "Decide interchange target" key, the image display apparatus indicates the interchange target selection is completed with dotted lines and the like, and then displays the interchange decided selection screen (FIG. 4(d)). Then, when the user presses the "OK" key, the image display apparatus displays the image of the channels A and the image of the channel B by interchanging them. Audio of the channel A is also replaced with that of the channel B (FIG. 4(e)). At this time, the image of the channel A is not fixedly displayed at the display position. When the user presses the "Next Page" key down in this state, all images of the channels (A, C-E) including the image of the channel A in the sub display area are replaced (FIG. 4(f)).

It is also possible that, when the user selects any channel in the sub display area to interchange with the channel displayed in the main display area, the image display apparatus lowers a display priority of the channel interchanged to be displayed in the sub display area. Thereby, the image display apparatus may prevent an unnecessary channel (the channel interchanged) from being displayed immediately in the sub display area upon operation of the "Next Page" key by the user.

In the second example of the channel display, when the user selects the channel in the sub display area (as the base point) to replace the channel in the main display area, the channel interchanged and displayed in the sub display area is not fixedly displayed but hidden in the following page of the sub display area. Accordingly, an operation by the user to select a channel displayed in the sub display area and to execute interchange includes an intention of the user not to view the channel previously displayed in the main display area any more.

Especially if the image display apparatus according to the present invention is applied to the channel display by the broadcasting receiver capable of receiving multiple channels such as MediaFLO, when the user, during reception of channels in the sub display area, performs zapping and the like to display a channel of the sub display area as the base point in the main display area, the channel previously displayed in the main display area is determined as an unnecessary channel. That is, when the user interchanges the channel in the sub display area as the base point and the channel in the main display area, the channel previously displayed in the main display area is not fixedly displayed in the sub display area but hidden in the following page of the sub display area. Accordingly, the unnecessary channel is not remained in the sub display area.

Figure 5:
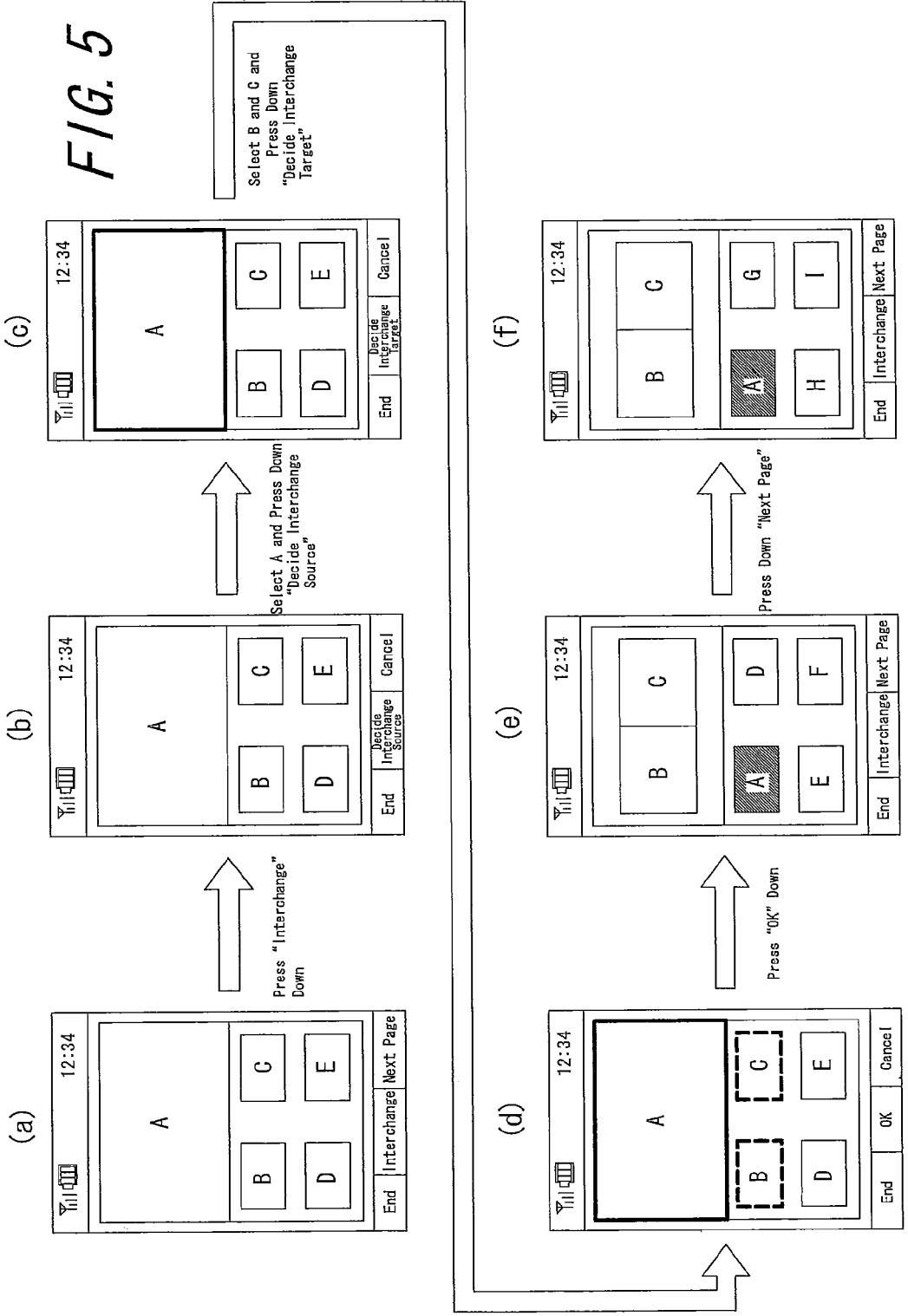
FIG. 5 is a diagram illustrating a third example of the channel display by the image display apparatus according to the first embodiment.

FIG. 5 is a diagram illustrating a third example of the channel display by the image display apparatus according to the first embodiment. When the user presses the "Interchange" key down in the list display screen shown in FIG. 5(a) in order to select a channel, the image display apparatus displays the interchange source channel selection screen (FIG. 5(b)). When the user selects the image of the channel A in the main display area (as the base point) and presses down the "Decide interchange source" key, the image display apparatus indicates that the interchange source selection is completed with the thick frame and the like, and then displays the interchange target channel selection screen (FIG. 5(c)). Next, when the user selects the images of the channel B and the channel C in the sub display area and presses down the "Decide interchange target" key, the image display apparatus indicates the interchange target selection is completed with dotted lines and the like, and then displays the interchange decided selection screen (FIG. 5(d)). Then, when the user presses the "OK" key down, the image display apparatus displays the images of the channel B and the channel C in the main display area. As for the audio, a priority is placed on the channel displayed on the left side, for example, and the audio of the channel A is replaced with that of the channel B (FIG. 5(e)). At this time, the image of the channel A is displayed at the fixed display position. When the user presses the "Next Page" key down in this state, the image of the channel A remains at the display position while images of other channels (D-F) are replaced (FIG. 5(f)).

In addition, if the user selects images of a plurality of channels (channel B and the channel C) displayed in the main display area (as the base point) and interchanges them with an image of a channel in the sub display area, the images of the plurality of channels (channel B and the channel C) are fixedly displayed at the display positions in the sub display area and remain in the following pages of the sub display area.

FIG. 6 is a diagram illustrating a fourth example of the channel display by the image display apparatus according to the first embodiment. When the user presses the "Interchange" key down in the list display screen shown in FIG. 6(a) in order to select a channel, the image display apparatus displays the interchange source channel selection screen (FIG. 6(b)). When the user selects the images of the channel B and the channel C in the sub display area (as the base points) and presses down the "Decide interchange source" key, the image display apparatus indicates that the interchange source selection is completed with thick frames and the like, and then displays the interchange target channel selection screen (FIG. 6(c)). Next, when the user selects the image of the channel A in the main display area and presses down the "Decide interchange target" key, the image display apparatus indicates the interchange target selection is completed with dotted lines and the like, and then displays the interchange decided selection screen (FIG. 6(d)). Then, when the user presses the "OK" key down, the image display apparatus displays the images of the channel B and the channel C in the main display area. As for the audio, the priority is placed on the channel displayed on the left side, for example, and the audio of the channel A is replaced with that of the channel B (FIG. 6(e)). When the user presses the "Next Page" key down in this state, all images of the channels (A, D-F) in the sub display area are replaced (FIG. 6(f)).

In addition, if the user selects the image of the channel B in the sub display area (as the base point) and executes interchange with the image of the channel A displayed in the main display area and then, within a predetermined period of time, selects the image of the channel C in the sub display area (as the base point) and executes interchange with the image in the main display area, the image display apparatus may display both images of the channel B and the channel C in the main display area.

Figure 7:
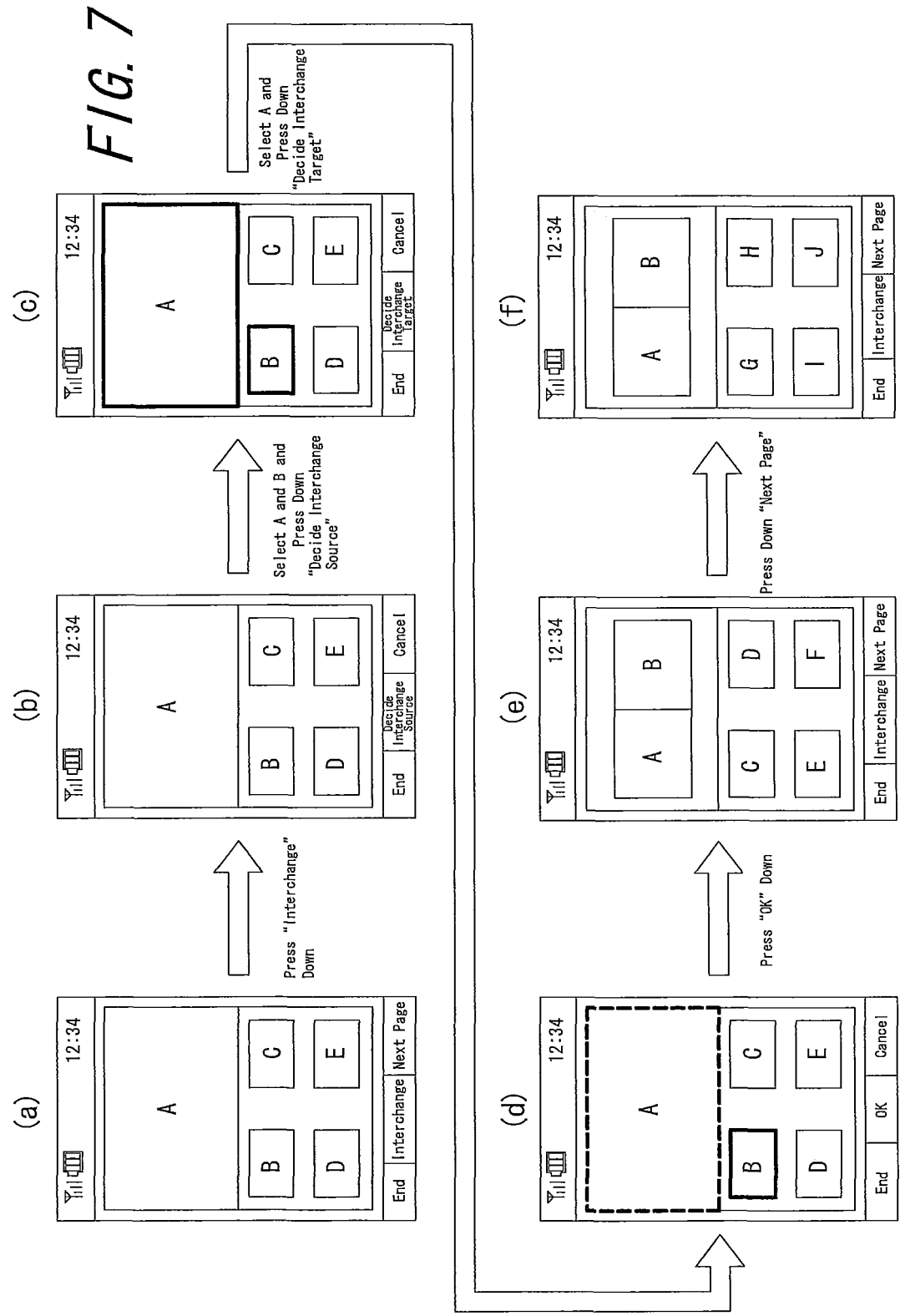
FIG. 7 is a diagram illustrating a fifth example of the channel display by the image display apparatus according to the first embodiment.

FIG. 7 is a diagram illustrating a fifth example of the channel display by the image display apparatus according to the first embodiment. When the user presses the "Interchange" key down in the list display screen shown in FIG. 7(a) in order to select a channel, the image display apparatus displays the interchange source channel selection screen (FIG. 7(b)). When the user selects the image of the channel A in the main display area and the image of the channel B in the sub display area (as the base point) and presses down the "Decide interchange source" key, the image display apparatus indicates that the interchange source selection is completed with thick frames and the like, and then displays the interchange target channel selection screen (FIG. 7(c)). Next, when the user selects the image of the channel A in the main display area and presses down the "Decide interchange target" key, the image display apparatus indicates that the interchange target selection is completed by displaying the image of the channel A with dotted lines and the like, and then displays the interchange decided selection screen (FIG. 7(d)).

Then, when the user presses the "OK" key down, the image display apparatus displays both images of the channel A and the channel B in the main display area. As for the audio, the priority is placed on the channel displayed on the left side, for example, and the audio of the channel A is reproduced (FIG. 7(e)). When the user presses the "Next Page" key down in this state, all images of the channels (C-F) in the sub display area are replaced (FIG. 7(f)).

Figure 8:
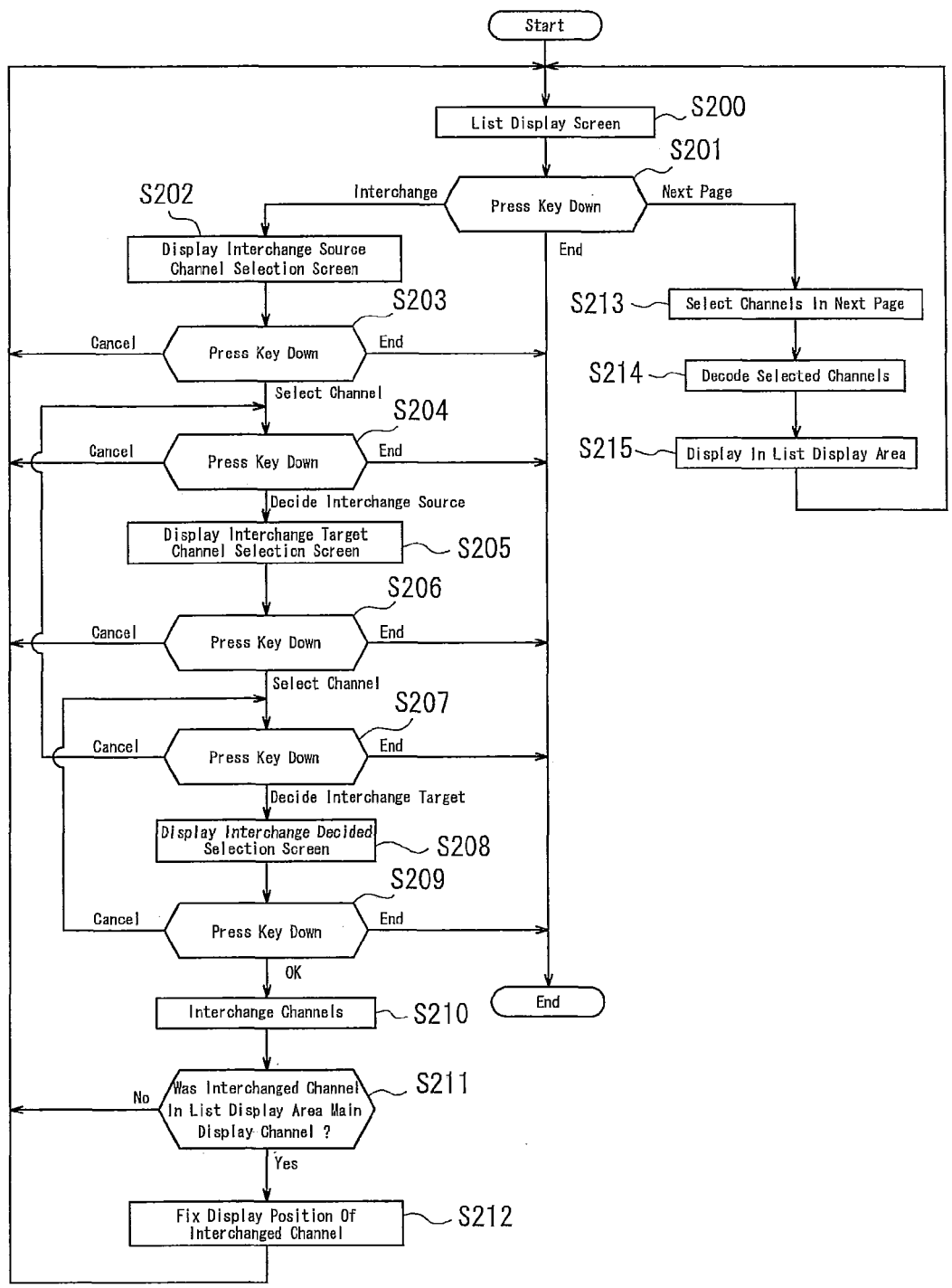
FIG. 8 is a flowchart illustrating operations when the image display apparatus according to the first embodiment displays the list.

FIG. 8 is a flowchart illustrating operations when the image display apparatus according to the first embodiment displays the list. First, the image display apparatus displays the list display screen (S200). At this time, if it is an initial activation, the image display apparatus displays channels in the main display area and in the sub display area in order, whereas reproducing a previous screen composition with reference to a last memory and the like if it is not the initial activation. When the user presses down a soft key displayed on the screen (S201), and if the key is the "Interchange" key, the image display apparatus displays the interchange source channel selection screen (S202). When the user selects an image of the interchange source channel by pressing down a key (S203), and then presses down the "Decide interchange source" key (S204), the image display apparatus displays the interchange target channel selection screen (S205). When the user selects an image of the interchange target channel by pressing down a key (S206), and then presses down the "Decide interchange target" key (S207), the image display apparatus displays the interchange decided selection screen (S208). When the user presses the "OK" key down (S209), the image display apparatus interchanges the channels (S210). If the interchanged channel displayed in the sub display area has been selected (as the base point) by the user as the interchange source channel in the main display area (S211), the image display apparatus fixes the display position of the interchanged channel (S212) and returns to the list display screen (S200). In contrast, if the interchanged channel displayed in the sub display area has not been selected (as the base point) by the user as the interchange source channel in the main display area (S211), the image display apparatus returns to the list display screen (S200) without fixing the display position of the interchanged channel.

When the user presses the "Next Page" key down (S201) in the list display screen (S200), the image display apparatus selects channels to be displayed in the following page (S213). A method to select the channels at this time may follow an order of the channels or lower the display priority of the channel once displayed in the main display area and designated as the interchange source channel while selecting other channels preferentially. Then, the image display apparatus decodes the data of the channels selected (S214), displays decoded data of the channels in the sub display area (S215) and then returns to the list display screen (S200).

If the image display apparatus according to the present invention, like the broadcasting receiver of MediaFLO, is capable of receiving multiple channels, it may be possible to continue decoding of the channel in the main display area and the channel at the fixed display position in the sub display area, while stopping decoding of other channels at display positions not fixed.

In addition, although two-layer encoding (layered coding) of a base component and an enhanced component is used in MediaFLO, the image display apparatus according to the present invention may output high definition images of the channel in the main display area and of the channel with the fixed display position in the sub display area by receiving and decoding the base component and the enhanced component, while outputting basic definition images of the channels without the fixed display position by receiving and decoding the base component.

Moreover, the image display apparatus according to the present invention can control whether to decode the channels in the sub display area and a level of the layered coding in accordance with the interchanging method of the channel in the main display area and the channel in the sub display area, thereby reducing resources for decoding.

Furthermore, according to this flowchart, the image display apparatus receives an operation to the "Cancel" key or the "End" key at any stage of user operation. If the "Cancel" key is pressed down, the image display apparatus returns to a previous screen, while closing the list display screen if the "End" key is pressed down.

Next, an image display apparatus according to a second embodiment of the present invention is described. The image display apparatus according to the second embodiment employs a touch panel as an input unit for receiving an input from a user, such as to receive a press-down input by a stylus or a finger. Alternatively, the input unit may be a mouse pointer. Other configurations are the same as those of the image display apparatus according to the first embodiment, and thus descriptions thereof are omitted.

FIG. 9 is a diagram illustrating a first example of the channel display by the image display apparatus according to the second embodiment. If the user touches the image of the channel A (as the base point) in the list display screen in FIG. 9(a) with the stylus in order to select the channel, the image display apparatus indicates that interchange source selection is completed with the thick frame and the like (FIG. 9(b)). Then, when the user drags the image of the channel A in the main display area to the image of the channel B in the sub display area, the image display apparatus interchanges the image of the channel A and the image of the channel B and displays them. Audio of the channel A is also replaced with that of the channel B (FIG. 9(c)). At this time, the image of the channel A is fixedly displayed at the display position. When the user touches the "Next Page" key with the stylus in this state, the image of the channel A with the fixed display position is fixedly displayed while images of other channels (C-E) are replaced (FIG. 9(d)).

Figure 10:
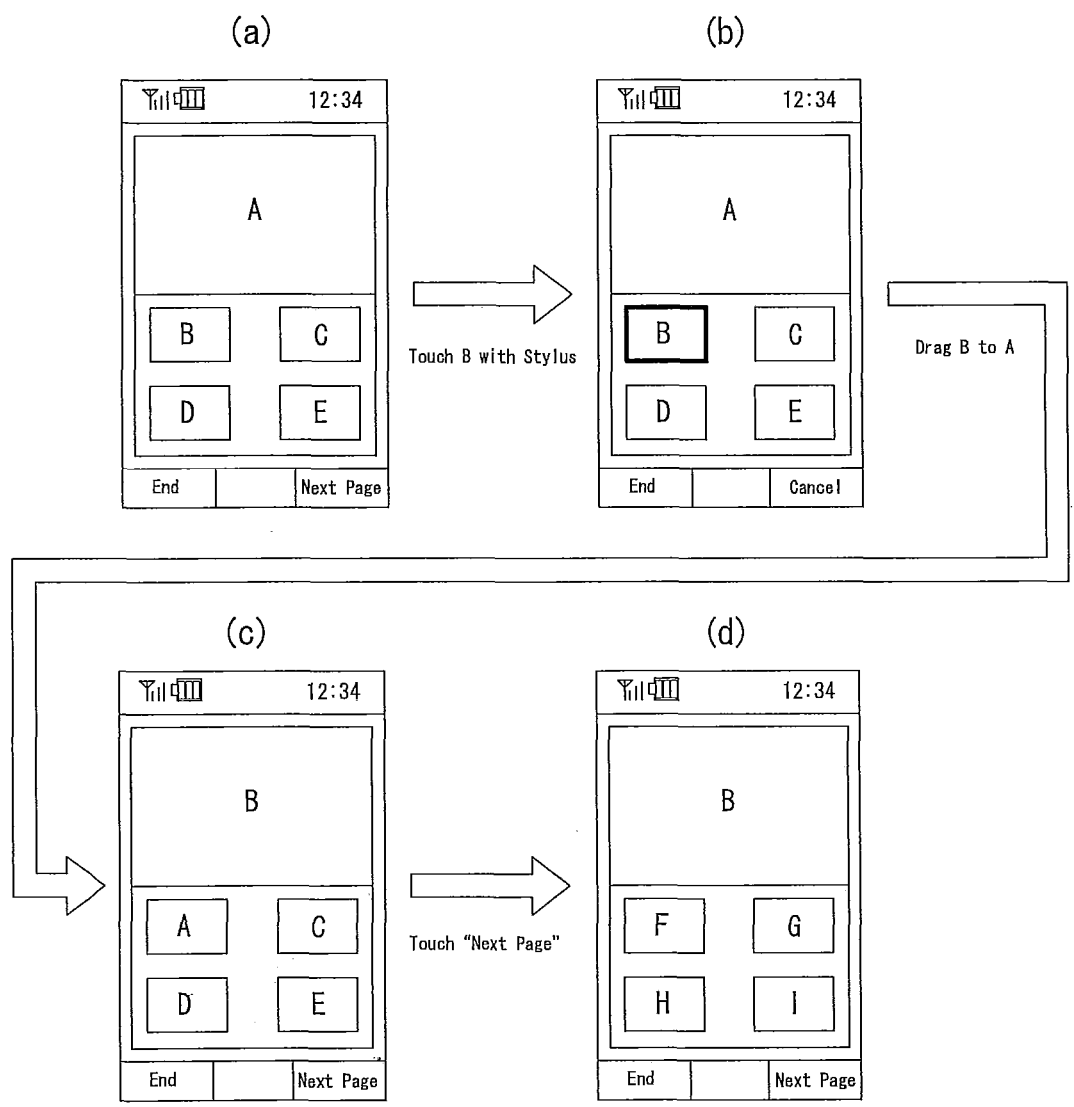
FIG. 10 is a diagram illustrating a second example of the channel display by the image display apparatus according to the second embodiment.

FIG. 10 is a diagram illustrating a second example of the channel display by the image display apparatus according to the second embodiment. If the user touches the image of the channel B (as the base point) in the list display screen in FIG. 10(a) with the stylus in order to select the channel, the image display apparatus indicates that interchange source selection is completed with the thick frame and the like (FIG. 10(b)). Then, when the user drags the image of the channel B in the sub display area to the image of the channel A in the main display area, the image display apparatus displays the image of the channel A and the image of the channel B by interchanging them. Audio of the channel A is also replaced with that of the channel B (FIG. 10(c)). At this time, the image of the channel A is not fixedly displayed at the display position. When the user touches the "Next Page" key with the stylus in this state, all images of the channels including the image of the channel A in the sub display area are replaced (FIG. 10(d)).

Figure 11:
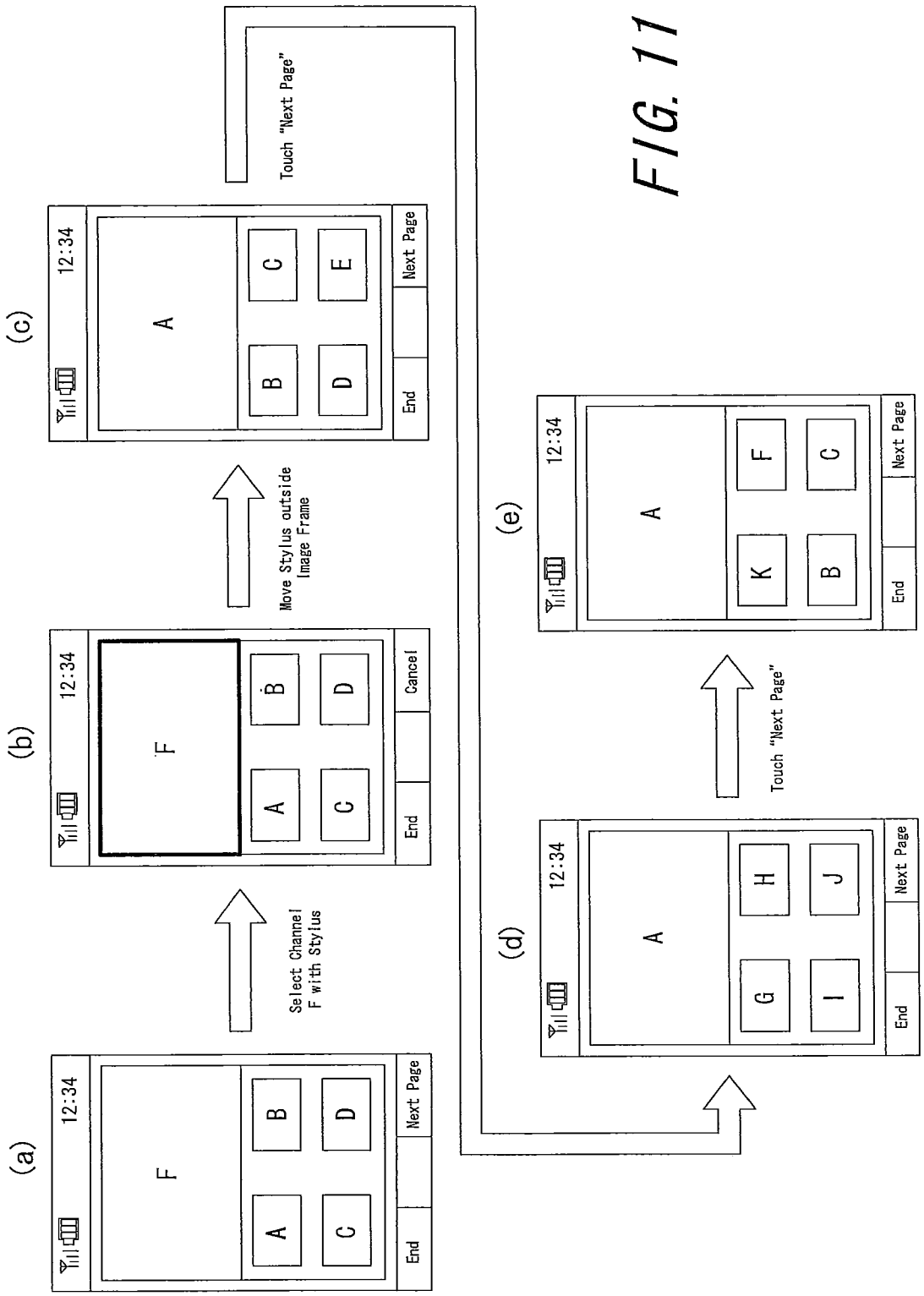
FIG. 11 is a diagram illustrating a third example of the channel display by the image display apparatus according to the second embodiment.

FIG. 11 is a diagram illustrating a third example of the channel display by the image display apparatus according to the second embodiment. It is assumed that the memory 104 of the image display apparatus stores images of channels A-K and that the image of the channel A is first and the image of the channel K is last in order.

If the user touches the image of the channel F (as the base point) in the main display area in the list display screen in FIG. 11(a) with the stylus in order to select the channel, the image display apparatus indicates that interchange source selection is completed with the thick frame and the like (FIG. 11(b)). Then, when the user drags the image of the channel F outside an image frame, the image display apparatus removes the image of the channel F, and then displays the image of the channel A with a highest priority displayed in the sub display area and displays the images of the channel B to channel E (next to the channel D in order) in the sub display area. Audio of the channel F is also replaced with that of the channel A (FIG. 11(c)). At this time, the image of the channel F has a lowest priority to be displayed in the sub display area. When the user touches the "Next Page" key with the stylus in this state, the images of all channels in the sub display area are replaced (FIG. 11(d)). At this time, since the image of the channel F is dragged outside the image frame and thus has the lowest priority to be displayed, it is not displayed but images of the channel G to the channel J are displayed. When the user once again touches the "Next Page" key with the stylus, the images of all channels (G-J) in the sub display area are replaced and the image of the channel F with the lowest priority is displayed next to the image of the channel K (FIG. 11(e)).

As stated above, when the user operates to toss (move) a channel outside the frame of display screen or to a specific display area while selecting the channel, the image display apparatus removes the image of this channel and displays an image of another channel at the image removed area. In addition, if there are too many channels to display all channels in the sub display area, the image display apparatus may lower the display priority of the removed channel when displayed in the sub display area. By lowering the display priority of the channel tossed (moved) outside the frame of the display screen or to the specific display area, the image display apparatus may prevent the unnecessary channel (the channel F tossed (moved), in this example) from being displayed immediately in the sub display area when the user operates the "Next Page" key.

Figure 12:
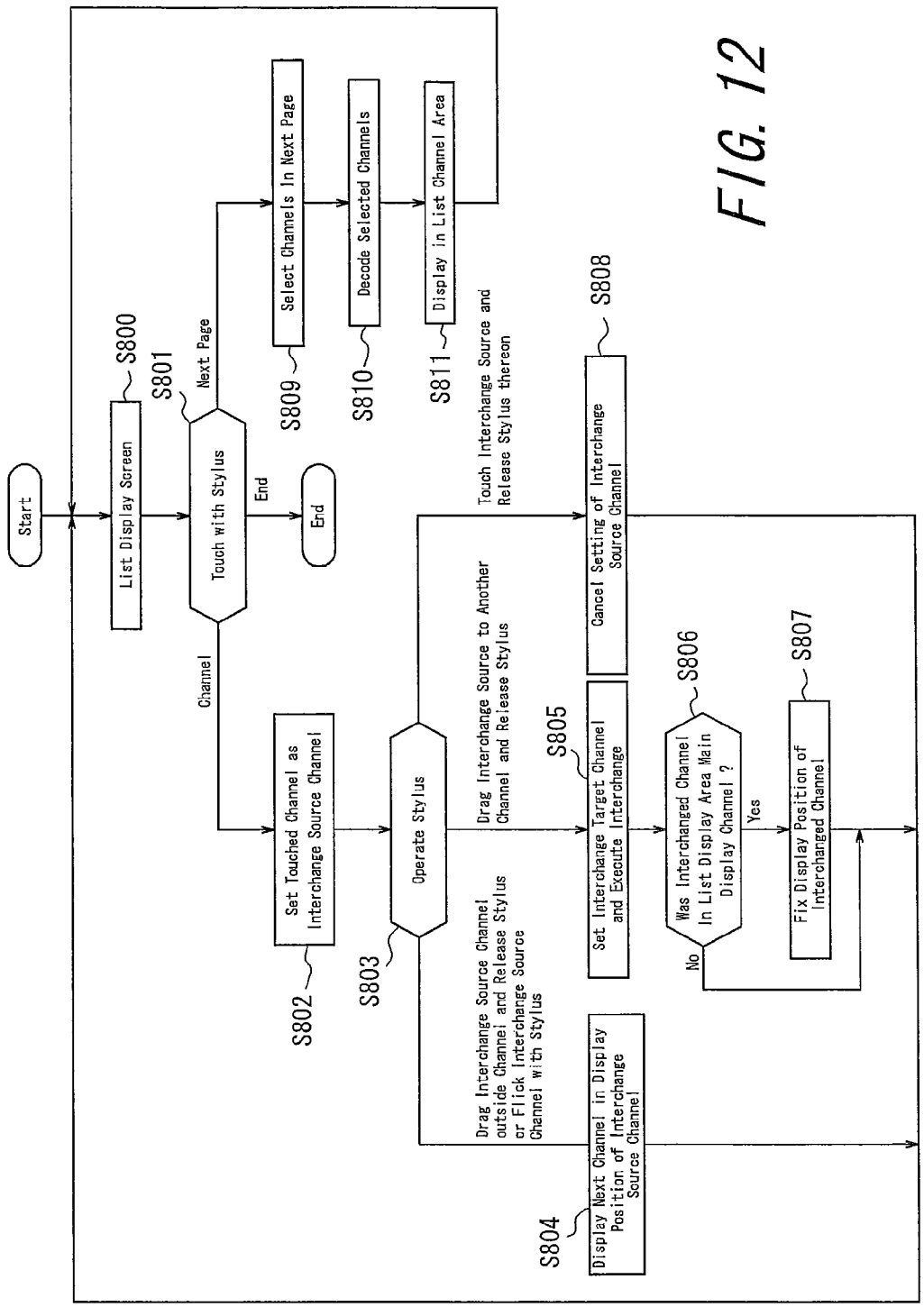
FIG. 12 is a flowchart illustrating operations when the image display apparatus according to the second embodiment displays the list.

FIG. 12 is a flowchart illustrating operations when the image display apparatus according to the second embodiment displays the list display screen.

First, the image display apparatus displays the list display screen (S800). At this time, if it is the initial activation, the image display apparatus displays the channels in the main display area and in the sub display area in order, whereas reproducing the previous screen composition with reference to the last memory and the like if it is not the initial activation. If there is a touch with the stylus by the user (S 801), the image display apparatus sets, if a touched point is an image, the channel of this image as the interchange source channel (as the base point) (S802).

If there is an operation of the stylus following the touch (S803) in which the user drags the image of the interchange source channel and releases the stylus outside the image frame thereof or flicks quickly the image of the interchange source channel, the image display apparatus replaces the image of the interchange source channel with an image of a next channel (for example, the channel with the highest priority) (S804) and returns to the list display screen (S800).

If there is an operation with the stylus following the touch (S803) in which the user drags the image of the interchange source channel and releases the stylus on an image of another channel, the image display apparatus sets this another channel as the interchange target channel and interchanges the channels (S805). If the interchanged channel displayed in the sub display area has been selected (as the base point) as the interchange source channel in the main display area (S806), the image display apparatus fixes the display position of the interchanged channel (S807) and returns to the list display screen (S800). In contrast, if the interchanged channel displayed in the sub display area has not been selected (as the base point) as the interchange source channel in the main display area (S 806), the image display apparatus returns to the list display screen (S800) without fixing the display position of the interchanged channel.

If there is an operation with the stylus following the touch (S803) in which the user touches the image of the interchange source channel and releases the stylus thereon, the image display apparatus cancels setting of the interchange source image (S 808) and returns to the list display screen (S800).

If there is a touch with the stylus by the user (S801) on the list display screen (S800), and if the touched point is the "Next Page" key, the image display apparatus selects channels to be displayed in the following page (S809). A method to select the channels at this time may follow the order of the channels or lower the display priority of the channel once displayed in the main display area and designated as the interchange target while selecting other channels preferentially. Then, the image display apparatus decodes images of the channel selected (S810), displays decoded images in the sub display area (S811) and then returns to the list display screen (S800).

According to this flowchart, the image display apparatus receives the operation to the "Cancel" key or the "End" key at any stage of the user operation. If the "Cancel" key is pressed down, the image display apparatus returns to the previous screen, while closing the list display screen if the "End" key is pressed down.

The invention claimed is:

1. An image display apparatus comprising:
   a display unit having a main display area for displaying an image of a main channel and a sub display area for displaying images of channels which can be interchanged with the image of the main channel in the main display area;
   a replacement unit for replacing the images of the channels displayed in the sub display area with images of other channels not displayed in the sub display area; and
   a control unit which, after an operation to interchange an interchange source image of a channel in the main display area and an interchange target image of a channel in the sub display area is performed, prevents the image of the interchange source channel previously displayed in the main display area which after the interchange is displayed in the sub display area from being a replacing target of the replacement unit.

2. The image display apparatus according to claim 1, wherein after an operation to interchange an interchange source image of a channel in the sub display area and an interchange target image of a channel in the main display area is performed, the control unit permits the interchange target image of the channel previously displayed in the main display area which after the interchange is displayed in the sub display area to be a replacing target of the replacement unit.

3. The image display apparatus according to claim 1, wherein the control unit interchanges an interchange target image of a channel in the main display area with a plurality of interchange source images of channels from the sub display area, and
   the display unit simultaneously displays the interchanged plurality of interchange source channels from the sub display area in the main display area.

4. The image display apparatus according to claim 3, wherein after an operation to interchange an interchange target image of a channel in the main display area with a plurality of interchange source channels from the sub display area is performed, the control unit permits the interchange target image of the channel previously displayed in the main display area which after the interchange is displayed in the sub display area to be a replacing target of the replacement unit.

* * * * *